United States Patent
Nimiya et al.

(10) Patent No.: US 6,913,822 B2
(45) Date of Patent: Jul. 5, 2005

(54) CABLE ERECTION TECHNIQUE AND CABLE ERECTION COIL

(75) Inventors: Takayuki Nimiya, Tokyo (JP); Zenichi Komine, Tokyo (JP); Akira Kuno, Tokyo (JP); Norio Takemura, Tokyo (JP); Katsunori Misaku, Ayase (JP); Kazue Misaku, Ayase (JP); Kaoru Takagi, Ayase (JP); Makiko Barker, Ayase (JP)

(73) Assignees: Daimei Telecom Engineering Corp., Tokyo (JP); Daimei Telecom Ltd., Tokyo (JP); Misaku Densetsu Co., Ltd., Kanagawa (JP)

( * ) Notice: Subject to any disclaimer, the term of this patent is extended or adjusted under 35 U.S.C. 154(b) by 0 days.

(21) Appl. No.: 10/295,914

(22) Filed: Nov. 18, 2002

(65) Prior Publication Data

US 2003/0066991 A1 Apr. 10, 2003

Related U.S. Application Data

(62) Division of application No. 09/641,883, filed on Aug. 18, 2000, now Pat. No. 6,505,818.

(30) Foreign Application Priority Data

Mar. 13, 2000 (JP) ........................................ 2000-069176

(51) Int. Cl.$^7$ ........................... B32B 15/08; H02G 1/02; H02G 1/04; B21F 35/02
(52) U.S. Cl. ........................ 428/371; 428/370; 428/379; 428/906; 254/137.3 R; 254/134.3 CL; 254/134.3 PA; 269/46; 140/89; 267/84
(58) Field of Search ................ 254/134.3 R, 134.3 CL, 254/134.3 PA; 269/46; 140/89; 267/84; 428/370, 371, 379, 906

(56) References Cited

U.S. PATENT DOCUMENTS

| | | | | |
|---|---|---|---|---|
| 2,744,707 A | * | 5/1956 | Peterson | ........................ 248/61 |
| 2,895,713 A | * | 7/1959 | Thornton | ........... 254/134.3 CL |
| 3,162,992 A | * | 12/1964 | Davis et al. | .................... 57/10 |
| 3,556,483 A | * | 1/1971 | Mantion et al. | .... 254/134.3 CL |
| 3,814,383 A | * | 6/1974 | Jackson | ............. 254/134.3 CL |
| 4,331,721 A | * | 5/1982 | Ayers | ......................... 428/23 |
| 4,960,266 A | * | 10/1990 | McDowell et al. | . 254/134.3 PA |
| 5,727,777 A | | 3/1998 | Chikiri et al. | |
| 5,789,701 A | | 8/1998 | Wettengel et al. | |
| 5,916,006 A | * | 6/1999 | Ganson | ........................ 446/85 |

* cited by examiner

Primary Examiner—Harold Pyon
Assistant Examiner—Chris Bruenjes
(74) Attorney, Agent, or Firm—Rader, Fishman & Grauer PLLC (57) ABSTRACT

The present invention concerns a cable erection technique using a plastically deformable coil comprising a metal wire formed in a spiral shape and synthetic resin coated on a surface of the metal wire, wherein said coil is inserted outside around a tensile line drawn between utility poles, the coil is elongated until its plastic deformation for forming a series of cable arrangement spaces inside the spiral, and a cable is extended, added or extracted through the cable arrangement space.

27 Claims, 6 Drawing Sheets

CABLE ERECTION TECHNIQUE AND CABLE ERECTION COIL

This application is a divisional application of U.S. patent application Ser. No. 09/641,883, filed on Aug. 18, 2000, now U.S. Pat. No. 6,505,818.

BACKGROUND OF THE INVENTION

The present invention concerns a technique for installing various cables and a coil to be used in this erection technique and, more particularly, a cable erection technique and a cable erection coil, simplifying the cable erection work and, at the same time, allowing to hold cables in a stable state during and after the erection work.

In general, when various cables such as communication cable or television cable or the like are to be erected, a messenger wire is put up as tensile line between utility poles, and metal hangers such as cable hangers are attached one by one to this messenger wire with an interval of 50 to 60 cm, for hanging cables in parallel.

However, in the cable erection work mentioned above, the operator carries a number of metal hangers, and attaches these hangers moving with an interval of 50 to 60 cm along the longitudinal direction of the messenger wire, and moreover, this hanger attachment operation is done in a height; therefore, such operation has been requiring tremendous time and labor, and considerably high skill.

Of late years, as a method for simplifying the cable erection work, it has been proposed to use an elastic chain coil formed into a continuous spiral from synthetic resin base material. When a cable is erected by means of chain coil, it is possible to insert the chain coil outside the messenger wire, to elongate this chain coil along the messenger wire and, at the same time, to extend the cable inside the coil and fix as it is. Therefore, the cable erection workability can be improved remarkably.

However, while the elastic chain coil presents an advantage of simple erection as mentioned above, on the contrary, when the fastener to the messenger wire is off, or when a part thereof is cut off by an accident or fire due to the component of synthetic resin, the coil shrinks causing such a problem that the cable droops. Besides, when the cable is erected by elongating the chain coil, if the coil fixed end comes off, or the elongated non fixed end is released accidentally, the chain cable shrinks to its original length by its elastic flexibility, obliging to resume the cable erection from the beginning and thus deteriorating its workability.

SUMMARY OF THE INVENTION

It is an object of the present invention to provide a cable erection technique and a cable erection coil, simplifying the cable erection work and, at the same time, allowing to hold cables stable during and after the erection work.

The cable erection technique of the present invention to attain the aforementioned object is a cable erection technique using a plastically deformable coil comprising a metal wire formed in a spiral shape and synthetic resin coated on a surface of the metal wire, wherein said coil is inserted outside around a tensile line drawn between utility poles, the coil is elongated until its plastic deformation for forming a series of cable arrangement spaces inside the spiral, and a cable is extended, added or extracted through the cable arrangement space.

Thus, a cable can be extended, added or extracted easily through the cable arrangement spaces, as the plastically deformable coil is inserted outside around the tensile line such as messenger wire drawn between utility poles, and the coil is elongated until its plastic deformation for forming a series of cable arrangement spaces inside the spiral.

Besides, as the aforementioned coil is provide with a property to deform plastically when it is elongated, it is possible to prevent the cable from drooping based on the resistance of plastically deformed coil, even if a coil fastener to the messenger wire is off, or a part thereof is cut off by accident or the like, and the cable can be kept stable for a long time. Besides, the cable does not shrink to its original length even if the coil fixed end comes off, or the elongated non fixed end is released accidentally during the cable erection work; so the cable erection work can be executed efficiently. Moreover, as the aforementioned is provided with metal wire, it can not be cut off by fire.

In the present invention, it is preferable to attach a coil extension device, having a reducing aperture smaller than the outer diameter of the coil, to the coil after having inserted the coil outside around the tensile line, and to elongate the coil until it deforms plastically all the way discharging the coil from the reducing aperture. The use of a coil extension device provided with such reducing aperture allows to improve the operation efficiency of the aforementioned cable erection technique and, at the same time, to set with good precision the coil size during the elongation.

To be more specific, it is preferable to insert the coil outside around the tensile line, then engage one end side of the coil to the tensile line, dispose a coil extension device having a reducing aperture smaller than the outer diameter of the coil at the one end side of the coil, draw the coil extension device to the other end side of the coil along the tensile line, and elongate the coil until it deforms plastically all the way discharging the coil from the reducing aperture. Otherwise, it is preferable to insert the coil outside around the tensile line, then engage one end side of the coil to the tensile line, dispose a coil extension device having a reducing aperture smaller than the outer diameter of the coil at the other end side of the coil, draw the other end side of the coil along the tensile line while fixing the position of the coil extension device, and elongate the coil until it deforms plastically all the way discharging the coil from the reducing aperture.

As tensile line for guiding the aforementioned coil, messenger wire made of a plurality of twisted steel wires, existing cable, complex cable integrating messenger wire and cable (so-called SS type cable) or others can be selected and, if necessary, it can be a temporary rope, or the like.

However, the cable erection technique of the present invention can also be applied to the case without tensile line installation. In this case, using a plastically deformable coil comprising a metal wire formed in a spiral shape and synthetic resin coated on a surface of the metal wire, the coil is elongated until its plastic deformation for forming a series of cable arrangement spaces inside the spiral, and a cable is extended, added or extracted through the cable arrangement spaces. Such cable erection technique is preferable for receiving the cable in the roof-space or under the floor arranging the cable.

In the present invention, cables to be extended, added or extracted include various cables made of a number of buried electric wires, optical wires or the like, such as communication cable, television cable, power transmission cable, or the like and, additionally, service wire and lead-in wire to the office, dwelling or others.

On the other hand, the cable erection coil of the present invention has a structure wherein a resin coated wire comprising a metal wire and synthetic resin coated on a surface of the metal wire is formed in a spiral shape, and is characterized by that said metal wire causes permanent deformation when the coil made of the resin coated wire is elongated.

It is preferable that said metal wire causes permanent deformation when the coil is elongated at least 10 times longer than the non-elongated length thereof. It is preferable the ratio of the cross-section of the metal wire to the cross-section of the resin coated wire is equal or superior to 25%.

BRIEF DESCRIPTION OF DRAWINGS

FIGS. 1(a)–1(c) show an example of plastically deformable coil used for the cable erection technique of the present invention.

FIGS. 2(a)–2(b) show an example of the coil extension device used for the cable erection technique of the present invention.

FIGS. 3(a)–3(b) show another coil extension device used for the cable erection technique of the present invention.

FIGS. 4(a)–4(b) show a state of cable erection by the cable erection technique of the present invention.

FIGS. 5(a)–5(b) show another state of cable erection by the cable erection technique of the present invention.

FIGS. 6(a)–6(b) show a cable support structure wherein another cable erection technique of the present invention is applied.

DETAILED DESCRIPTION OF PREFERRED EMBODIMENT

Now, the present invention will be described in detail referring to attached drawings.

Figure 1A:
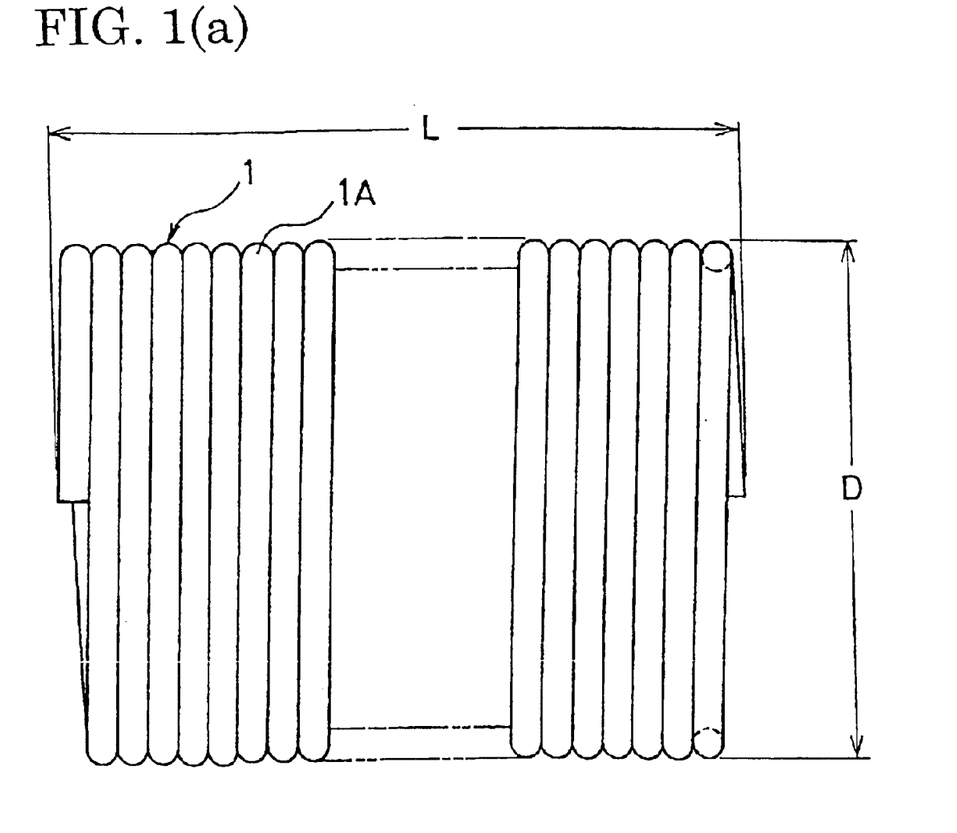
FIG. 1(a) is a side view of the coil, FIG. 1(b) a cross-section of a resin coated wire composing the coil, and FIG. 1(c) a side view of the resin coated wire.
Figure 1B:
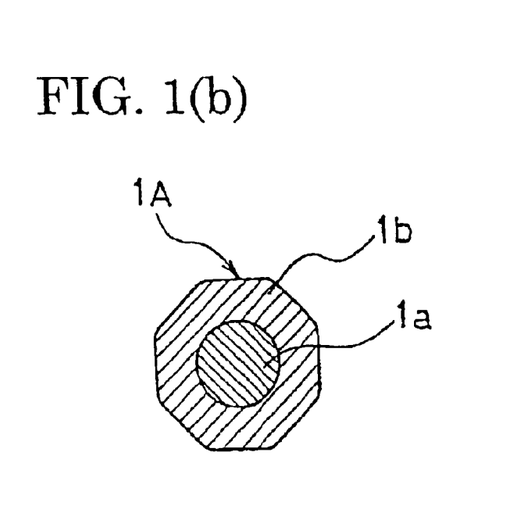
Figure 1C:
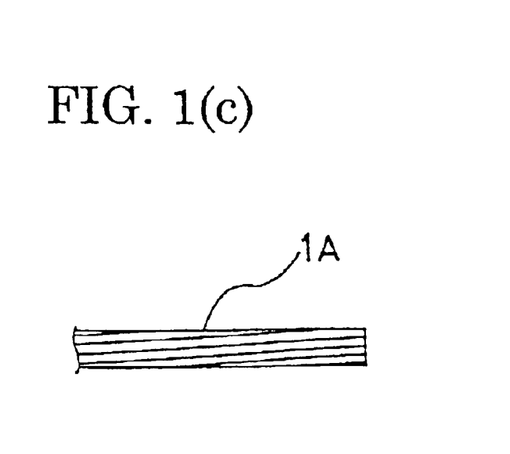

FIGS. 1(a)–1(c) show an example of plastically deformable coil used for the cable erection technique of the present invention. As shown in FIG. 1(a) to FIG. 1 (c), a plastically deformable coil 1 has a structure wherein a resin coated wire 1A made by coating around a metal wire 1a with synthetic resin 1b is formed in a spiral shape. The cross-section shape of the resin coated wire 1A is preferably non-circular, including polygons such a octagon or others. When the resin coated wire 1A is twisted so as to rotate the non-circular shape spirally in the longitudinal direction of the metal wire 1a, the wind sound generated during the cable erection may be reduced. The coil 1 has a length L in the non-elongated state without load before used for the cable erection technique, however, it will have a state elongated to a length corresponding to one span between electric utility poles during the cable erection. When the elongated coil is short or too long for one span between electric utility poles, the coil 1 may be cut off or prolonged.

The coil 1 mentioned above is provided with such property that the metal wire 1a deforms plastically, when the coil is elongated from its non-elongated length L. To be more specific, when the coil is elongated by 10 times or more than its non-elongated length L, the coil 1 shrinks from the diameter D and, at the same time, it deforms plastically so that the length after elongation will be kept. If this metal wire 1a deforms at an elongation less than 10 times of its non-elongated length L, it becomes difficult to elongate the coil 1 so as to keep the spiral pitch at constant interval.

To provide the aforementioned coil 1 made of complex material of the metal wire 1a and the synthetic resin 1b with said property, the material of the metal wire 1a and the synthetic resin 1b may be selected properly and the cross-section ration of the metal wire 1a at the resin coated wire 1A may be set properly.

As the metal wire 1a, iron wire, copper wire, aluminum wire or the like of 1.0 to 5.0 mm in diameter can be used. Especially, it is preferable to used iron wire to provide the most appropriate plastic deformation for cable erection. Besides, it is advantageous to use galvanized wire to prevent from corrosion. If the diameter of the metal wire 1a is less than 1.0 mm, its capability to hold the cable becomes insufficient and, on the contrary, if it is more than 5.0 mm, the coil itself becomes heavy unfavorably.

It is preferable to set the ratio of the cross-section of the metal wire to the cross-section of the resin coated wire is equal or superior to 25%. If the ratio of the cross-section of the metal wire is less than 25%, elastic deformation of the synthetic resin 1b makes plastic deformation of the metal wire 1a difficult. Note that the cross-section shape of the metal wire 1a is not specially limited and, in addition to the circle as shown in the drawing, it can take oval, triangular, square, octagonal or other polygonal shape.

On the other hand, as synthetic resin 1b, thermoplastic resin such as polyester, polyamide, polyolefin can be used. Among these thermoplastic resins, polyester is especially preferable. As this polyester, polyethylene terephthalate, polybutylene terephthalate, or copolymer polyester obtained by copolymerization of them with a third component such as adipic acid, isophthalic acid, isophthalic sulfonate and polyethylene glycol can be cited.

Moreover, as polyamide, nylon 6, nylon 66, nylon 610, nylon 612, nylon 11, nylon 12 and copolymer polyamide made by combination of components of respective nylon can be cited.

Obviously, these thermoplastic resins may comprise as desired heat resistant agent, weather resistant agent, photo-resistant agent, antioxidant, antistatic additive, smoother, dye or other normal additive components as necessary.

The non-elongated length L of the coil 1 is preferably short from the viewpoint of handling; however, its workability will be favored if it is set to elongate at least up to 1 span between utility poles during cable erection. For this effect, when the non-elongated length L is within the range of 500 to 2000 mm, the elongated length is preferably set a range of 10 to 80 times, especially 20 to 60 times of that length L. Moreover, the outer diameter D of the non-elongated coil 1 is advantageously set to a range of 20 to 120 mm.

Now, the cable erection technique of the present invention will be described. A coil extension device shown in FIGS. 2(a)–2(b) or FIGS. 3(a)–3(b) can be used to extend the aforementioned coil 1.

Figure 2A:
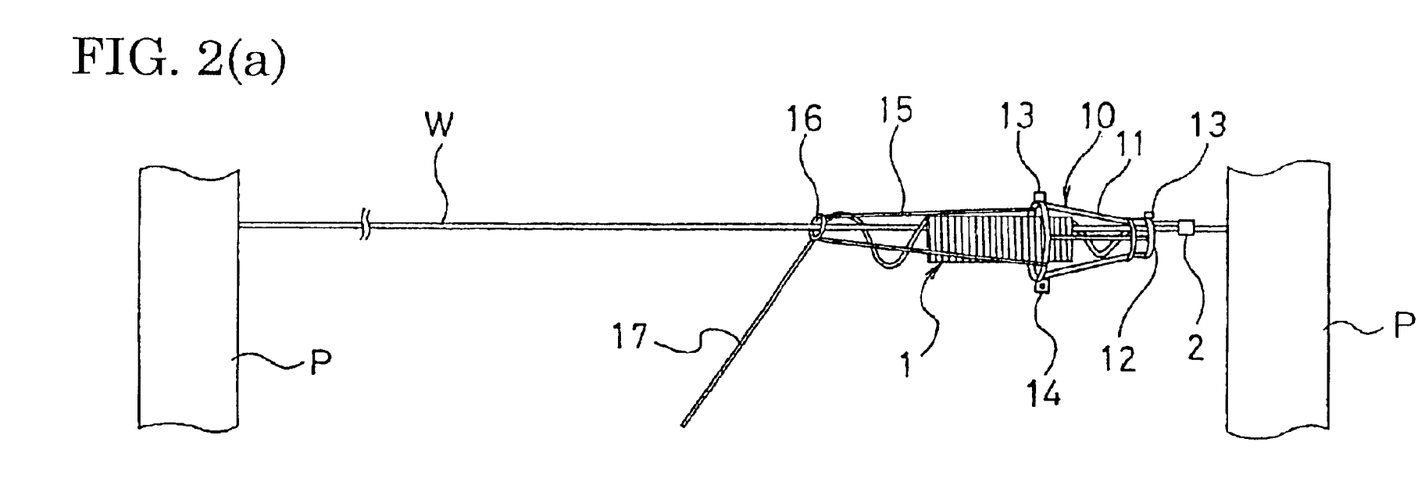
FIG. 2(a) is a side-view of non-elongated coil, and FIG. 2(b) a side-view of elongated coil.
Figure 2B:
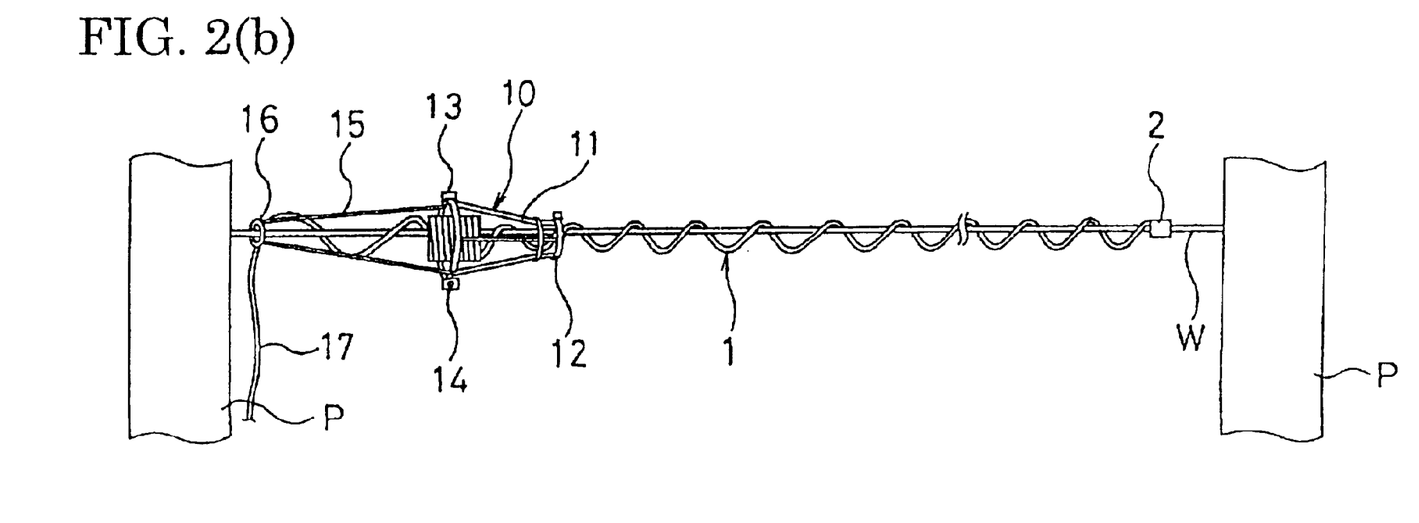

FIGS. 2(a)–2(b) a coil extension device 10 has a structure made by assembling a bone member 11 in a cone shape, and is provided with a reducing aperture 12 smaller than the outer diameter of the coil 1 at the apex of the cone. Moreover, the coil extension device 10 is made of two members divided a long the cone slant, and both of these members can open or close by means of a hinge 13 and, moreover, can be cramped in closed state by means of a bolt 14.

When the coil 1 is extended by the aforementioned coil extension device 10, as shown in FIG. 2(a), first the coil 1 is inserted outside around a messenger wire W drawn between utility poles P, P, then one end side of the coil 1 is attached to the messenger wire W with a cram member 2, then the coil extension device 10 provided with the reducing aperture 12 smaller than the outer diameter of the coil 1 is disposed at one end side of the coil 1. To be more specific, the reducing aperture 12 is positioned at the one end side of the coil 1 and the coil extension device 10 is installed so that the cone section of the bone member 11 covers the coil 1. Then, as shown in FIG. 2(b), the coil extension device 10 is pulled toward the other end side of the coil 1 along the messenger wire W, by means of a traction wire 15 attached to the cone bottom of the bone member 11, and the coil 1 is elongated until its plastic deformation all the way being discharged from the reducing aperture 12. In order to operate from the ground the coil extension device 10 moving along the messenger wire W, a hook 16 is hung on the messenger wire W, and a ground operation rope 17 is attached to this hook 16. It is also advantageous to attach the other end side of the coil 1 to the hook 16.

When the coil 1 is extended using the coil extension device 10 as mentioned above, the pitch and the outside diameter of the elongated coil 1 can be set based on the size of the reducing aperture 12 and, moreover, the coil 1 can be extended evenly along its total length. As the coil extension device 10 is assembled of the bone member 11, the coil 1 can be handled easily through its gap, and moreover, as it is light, it will not apply much load to the messenger wire W.

Figure 3A:
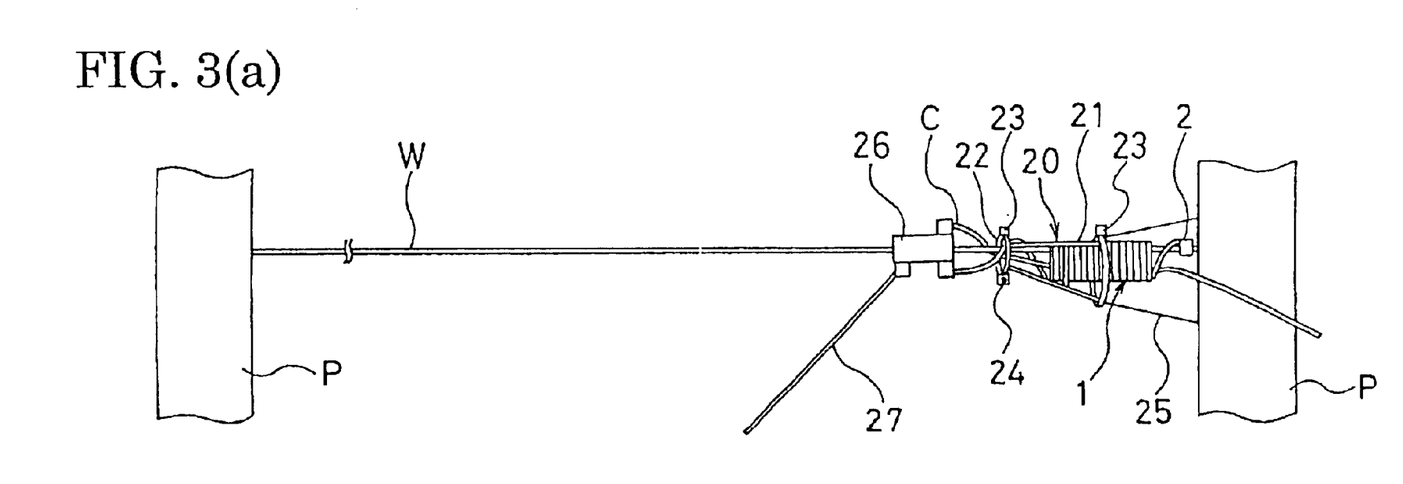
FIG. 3(a) is a side-view of non-elongated coil, and FIG. 3(b) a side-view of elongated coil.
Figure 3B:
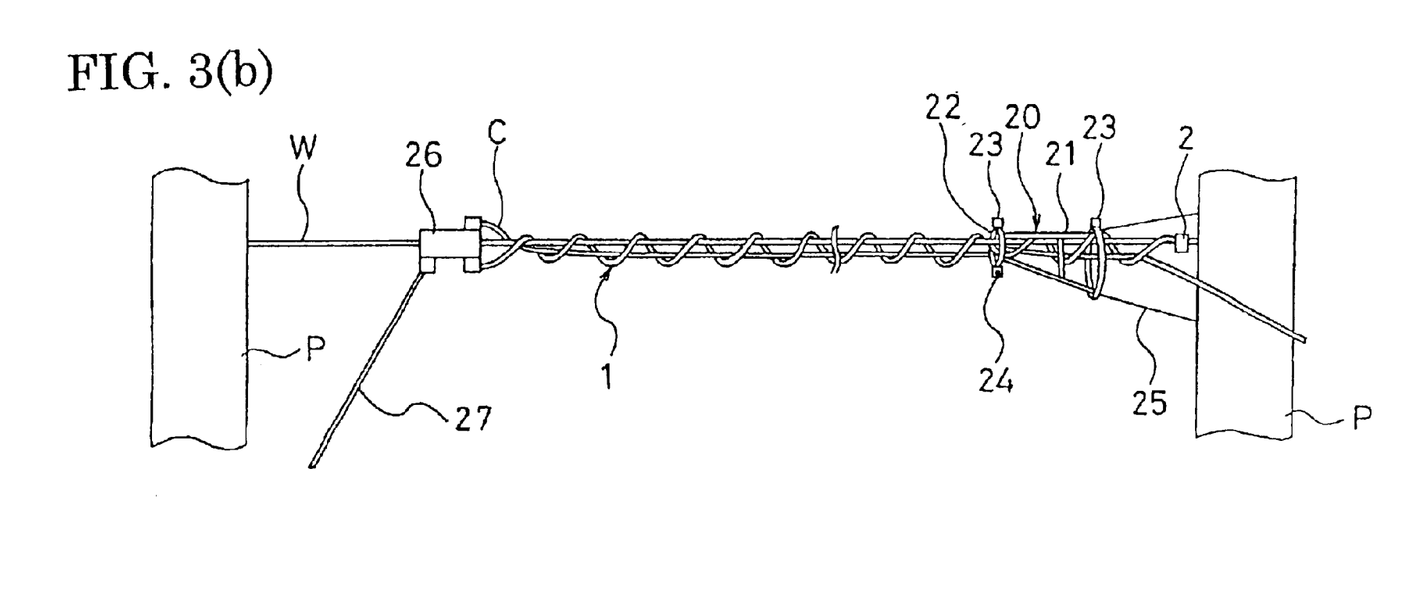

On the other hand, in FIGS. 3(a)–3(b), a coil extension device 20 has a structure made by assembling a bone member 21 in a cone shape, and is provided with a reducing aperture 22 smaller than the outer diameter of the coil 1 at the apex of the cone. Moreover, the coil extension device 20 is made of two members divided along the cone slant, and these both members can open or close by means of a hinge 23 and, moreover, can be cramped in closed state by means of a bolt 24.

When the coil 1 is extended by the aforementioned coil extension device 20, as shown in FIG. 3(a), first the coil 1 is inserted outside around a messenger wire W drawn between utility poles P, P, then one end side of the coil 1 is attached to the messenger wire W with a cramp member 2, then the coil extension device 20 provided with the reducing aperture 22 smaller than the outer diameter of the coil 1 is disposed at the other end side of the coil 1. To be more specific, the reducing aperture 22 is positioned at the other end side of the coil 1 and the coil extension device 20 is installed so that the cone section of the bone member 21 covers the coil 1.

Then, as shown in FIG. 3(b), the other end side of the coil 1 is connected to a leading chariot 26 running freely over the messenger wire W, then the other end side of the coil 1 is drawn by the leading chariot 26 along the messenger wire W, with the position of the coil extension device 20 fixed with respect to the utility pole P using a fixing rope 25 attached to the cone bottom of the bone member 21, and the coil 1 is elongated until its plastic deformation all the way being discharged from the reducing aperture 22. This leading chariot 26 permits only the advance, and a brake acts during the regression. In order to operate from the ground the leading chariot 26 moving along the messenger wire W, a ground operation rope 27 is attached to the leading chariot 26. Note that such leading chariot 26 may also be applied to the erection technique shown in FIGS. 2(a)–2(b).

When the coil 1 is extended using the coil extension device 20 as mentioned above, the pitch and the outside diameter of the elongated coil 1 can be set based on the size of the reducing aperture 22 and, moreover, the coil 1 can be extended evenly along the total length. As the coil extension device 20 is assembled of the bone member 21, the coil 1 can be handled easily through its gap, and moreover, as it is light, it will not apply much load to the messenger wire W. In addition, if the tip of the cable C is connected to the leading chariot 26, the cable C can be extended at the same time as the extension of the coil 1.

Figure 4A:
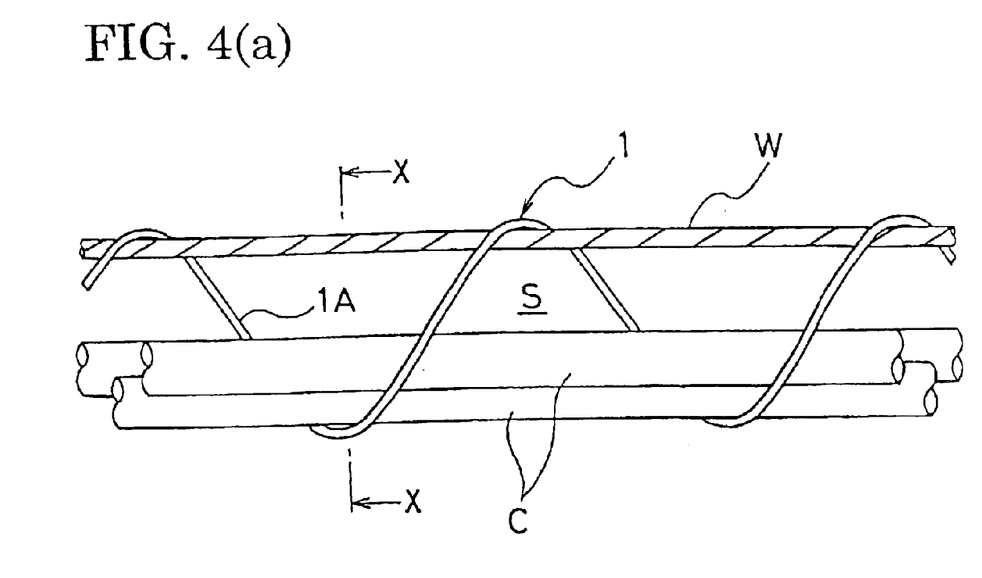
FIG. 4(a) shows a side-view, and FIG. 4(b) a view along the line X—X.
Figure 4B:
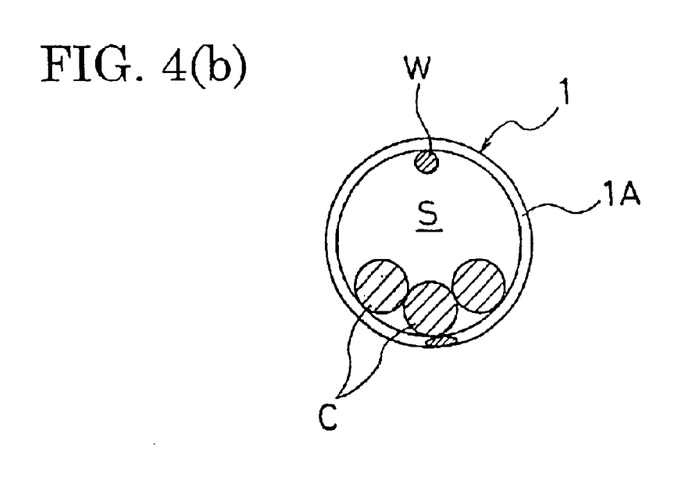

FIGS. 4(a)–4(b) show a state of cable erection by the cable erection technique of the present invention. As shown in FIG. 4(a) and FIG. 4(b), according to the cable erection technique of the present invention, using a plastically deformable coil 1, the coil 1 is inserted outside around the messenger wire W drawn between utility poles, the coil is elongated until its plastic deformation for forming a series of cable arrangement spaces S inside the spiral, and a cable C is extended, added or extracted through this cable arrangement space S.

In the cable erection work using the aforementioned coil 1, all suspension points for hanging the cable C through a helical loop with a constant interval can be formed, and the cable C can be extended by only one operation of simply elongating the coil 1 between utility poles and, moreover, once the cable C is extended, the coil 1 can be used as cable fixing hanger as it is. Consequently, it makes unnecessary to erect temporarily the cable C by means of a cable extension jig such as pulley, and simplifies the operation to attach a number of metal hangers one by one at a constant interval as in the conventional cable erection.

When the cable C hung from the messenger wire W is to be added, the cable C can be inserted simply from the utility pole side along a series of cable arrangement spaces S. Besides, when the number of cables C hung on the messenger cable W is to be reduced, any number of cable(s) C may be extracted from the cable arrangement spaces S. As the cable C is hung by the plastically deformed coil 1, the cable C does not droop extremely during the extraction.

Moreover, as the metal wire 1a deforms plastically when the coil 1 is elongated, the plastically deformed metal cable 1a prevents the cable C from drooping, even if a coil fastener to the messenger wire W is off, or a part the coil 1 is cut off by accident or the like. Besides, the cable does not shrink to its original length even if the coil 1 fixed end comes off, or the elongated non fixed end is released accidentally during the cable erection work. Therefore, the cable erection technique using the aforementioned coil 1 allows to hold the cable C in a stable state during and after the erection. Moreover, even if a fire breaks out in the vicinity of the cable erection emplacement, causing the cable 1 inflamed and the synthetic resin 1b burned out, the cable C can be held by the metal wire 1a.

Figure 5A:
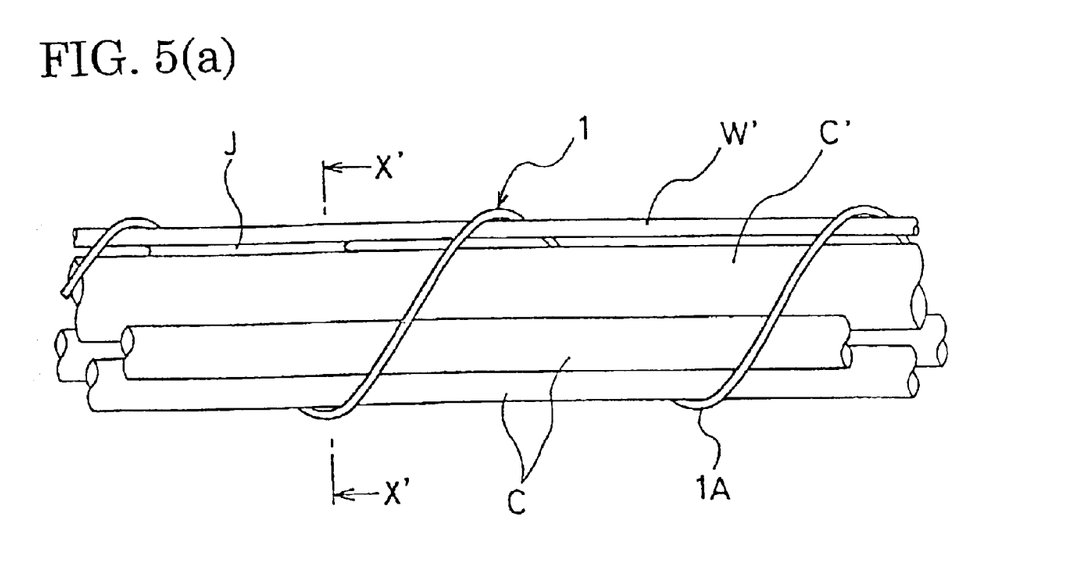
FIG. 5(a) shows a side-view, and FIG. 5(b) a view along the line X'—X'.
Figure 5B:
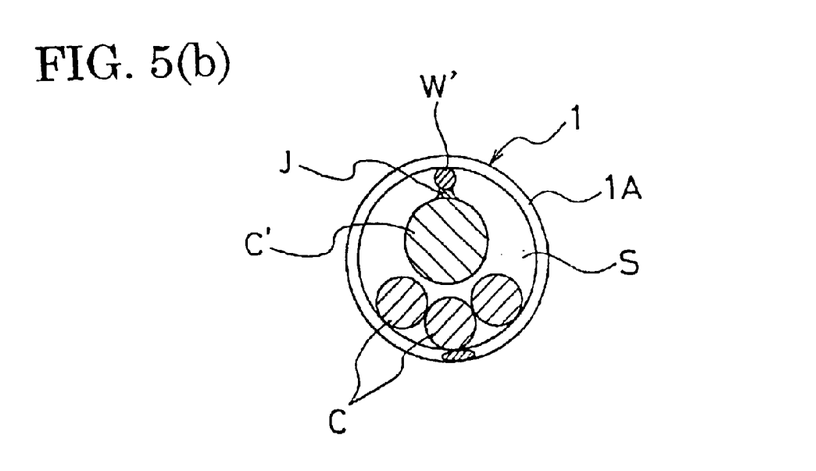

FIGS. 5(a)–5(b) show another state of cable erection by the cable erection technique of the present invention. In this embodiment, a SS type cable made by integrating a messenger wire W' and a cable C' through a number of joints J arranged longitudinally with a predetermined interval is used as tensile line. As shown in FIG. 5(a) and FIG. 5(b), when the SS type cable is used as tensile line, the coil 1 is inserted outside around the SS type cable drawn between utility poles, the coil is elongated until its plastic deformation for forming a series of cable arrangement spaces S inside the spiral, and a cable C is extended, added or extracted through these cable arrangement spaces S.

Figure 6A:
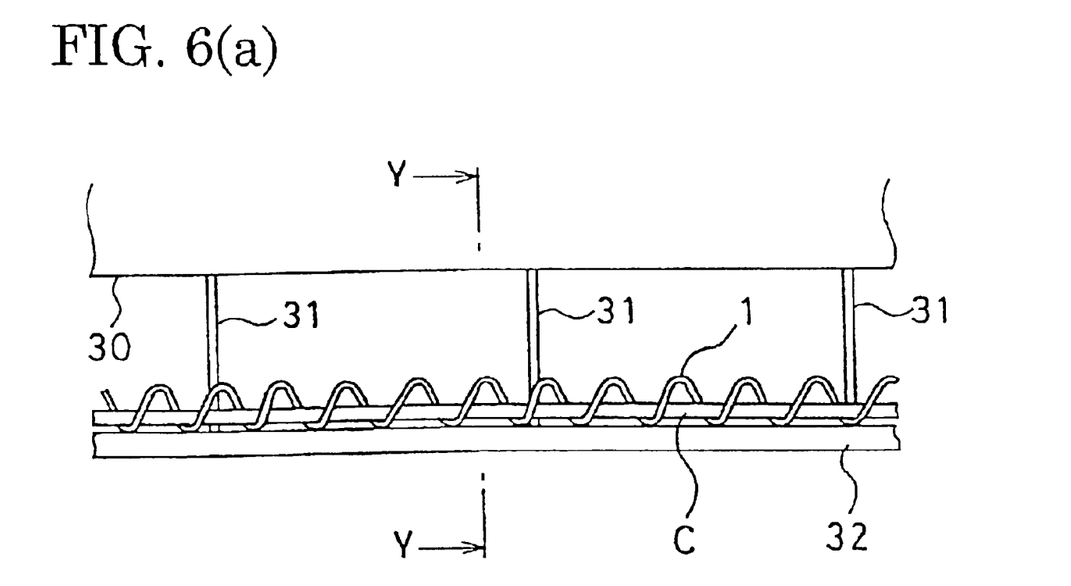
FIG. 6(a) shows a side-view, and FIG. 6(b) a view along the line Y—Y.
Figure 6B:
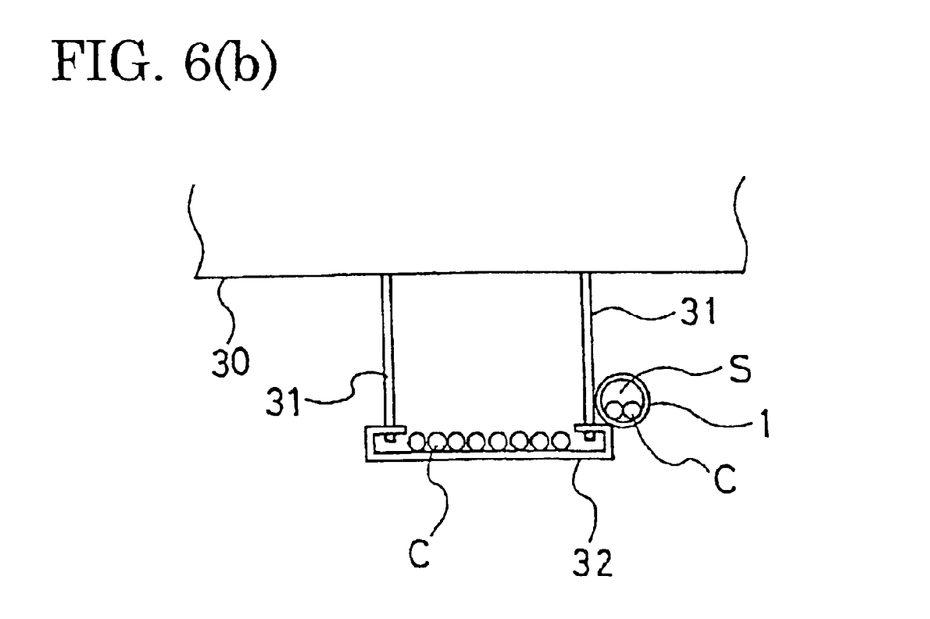

FIGS. 6(a)–6(b) show a cable erection technique by another embodiment of the present invention. This embodiment concerns a cable erection technique for installing cable in a roof-space without using tensile line. In FIG. 6(a) and FIG. 6(b), a pair of right and left stays 31, 31 are hung with a predetermined interval from a top wall surface 30 to the roof-space and a support plate 32 is attached to the lower end thereof. A number of cables C are mounted on this support plate 32.

Since the number of cable C to be mounted on the support plate 32 being limited, conventionally, another support plate has been installed next to the support plate 32 when it is desired to install cables more than this limit. However, it requires much labor to install another support plate. So, it is preferable to apply the cable erection technique of the present invention to such a cable support structure too.

Namely, the aforementioned coil 1 is elongated until its plastic deformation for forming a series of cable arrangement spaces S inside the spiral and attached to the stay 31, 31 along the support plate 32, and the cable C is extended, added or extracted through the cable arrangement space S.

As such coil 1 elongated to its plastic deformation keeps its shape to a certain degree, it is effective as support structure of the cable C. Moreover, the cable C can be extended, added or extracted easily through the cable arrangement space S and, besides, the cable C can be kept stable during and after the erection work.

The cable erection technique of the present invention described above can be applied to the erection of various cables such as communication cable, television cable, power transmission cable, or the like.

Other than the use method mentioned above, the cable erection technique of the present invention is also preferable for installing cable inside the underground passage, common drain, culvert or the like. In these underground passage, common drain, culvert or the like, the coil may be elongated along a tensile line such as messenger wire or the like, or the coil may well be elongated without using a tensile line.

As described above, according to the present invention, using a plastically deformable coil comprising a metal wire formed in a spiral shape and synthetic resin coated on a surface of the metal wire, the coil is inserted outside around the tensile line drawn between utility poles, the coil is elongated until its plastic deformation for forming a series of cable arrangement spaces inside the spiral, and a cable is extended, added or extracted through the cable arrangement space. Therefore, cable erection workability can be improved remarkably and, moreover, the cable can be held in a stable condition during and after the erection work.

What is claimed is:

1. A cable erection device comprising:
a coil extension device having a reducing aperture, wherein:
said coil extension device is structurally adapted for traveling along a messenger wire drawn between utility poles to urge a non-elongated portion of a plastically deformable coil toward one of said utility poles,
a distal end of said plastically deformable coil is dischargeable through said reducing aperture toward another of said utility poles,
said plastically deformable coil is a metal wire formed in a spiral shape having a synthetic resin coated on a surface of said metal wire, and said synthetic resin-coated metal wire has a non-circular shape in cross-section and twisted in its longitudinal direction.

2. A cable erection device according to claim 1, wherein a length of said plastically deformable coil when elongated is set in a range of 10 times to 80 times of said plastically deformable coil when non-elongated.

3. A cable erection device according to claim 1, wherein a length of said plastically deformable coil when non-elongated is set in a range of 500 mm to 2000 mm.

4. A cable erection device according to claim 1, wherein said elongated portion has an elongated outer diameter smaller than said non-elongated outer diameter.

5. A cable erection device according to claim 1, wherein said non-elongated portion has a non-elongated outer diameter larger than said reducing aperture.

6. A cable erection device according to claim 1, wherein the ratio of said cross-section of said metal wire to the cross-section of said plastically deformable coil is equal or superior to 25%.

7. A cable erection device according to claim 1, wherein said synthetic resin-coated metal wire has an original non-elongated length defining a non-elongated state and a property to permit the metal wire to undergo plastic deformation when the coil is elongated.

8. A cable erection device according to claim 1, wherein said metal wire causes permanent deformation when said plastically deformable coil is elongated at least 10 times longer than said non-elongated length thereof.

9. A cable erection device according to claim 1, wherein the pitch and the outside diameter of said elongated portion are set based on the size of said reducing aperture.

10. A cable erection device according to claim 1, wherein a traction wire is attached to said coil extension device, said traction wire being structurally adapted to pull said coil extension device along said messenger wire.

11. A cable erection device according to claim 1, wherein said elongated portion is discharged from said reducing aperture when said coil extension device travels along said messenger wire.

12. A cable erection device according to claim 1, wherein said plastically deformable coil surrounds said messenger wire.

13. A cable erection device according to claim 1, wherein said distal end of said plastically deformable coil is extended through said reducing aperture.

14. A cable erection device according to claim 1, wherein said coil extension device urges said non-elongated portion along said messenger wire when said coil extension device travels along said messenger wire.

15. A cable erection device according to claim 1, wherein a cram attaches said distal end to said messenger wire.

16. A cable erection device according to claim 15, wherein said plastically deformable coil is elongating from said cram member.

17. A cable erection device comprising:
a coil extension device having a reducing aperture; and a leading chariot, wherein:
a distal end of a plastically deformable coil is extendable through said reducing aperture for attachment to said leading chariot,
said leading chariot is structurally adapted for traveling along a messenger wire drawn between utility poles to discharge said plastically deformable coil through said reducing aperture toward one of said utility poles,
said coil extension device is fixed with respect to another of said utility poles, said plastically deformable coil is a metal wire formed in a spiral shape having a synthetic resin coated on a surface of said metal wire, and said synthetic resin-coated metal wire has a non-circular shape in cross-section and twisted in its longitudinal direction.

18. A cable erection device according to claim 17, wherein a length of said plastically deformable coil when elongated is set in a range of 10 times to 80 times of said plastically deformable coil when non-elongated.

19. A cable erection device according to claim 17, wherein a length of said plastically deformable coil when non-elongated is set in a range of 500 mm to 2000 mm.

20. A cable erection device according to claim 17, wherein an elongated portion of said plastically deformable coil has an elongated outer diameter smaller than said non-elongated outer diameter of said plastically deformable coil.

21. A cable erection device according to claim 17, wherein a non-elongated portion of said plastically deformable coil has an outer diameter larger than said reducing aperture.

22. A cable erection device according to claim 17, wherein the ratio of said cross-section of said metal wire to the cross-section of said plastically deformable coil is equal or superior to 25%.

23. A cable erection device according to claim 17, wherein said synthetic resin-coated metal wire has an original non-elongated length defining a non-elongated state and a property to permit the metal wire to undergo plastic deformation when the coil is elongated.

24. A cable erection device according to claim 17, wherein said metal wire causes permanent deformation when said plastically deformable coil is elongated at least 10 times longer than said non-elongated length thereof.

25. A cable erection device according to claim 17, wherein the pitch and the outside diameter of said elongated portion of said plastically deformable coil are set based on the size of said reducing aperture.

26. A cable erection device according to claim 17, wherein said plastically deformable coil surrounds said messenger wire.

27. A cable erection device according to claim 17, wherein a cram attaches another distal end of said plastically deformable coil to said messenger wire.

* * * * *